July 7, 1931.  W. R. UGGLA  1,813,369

POWER TRANSMISSION GEARING

Filed Oct. 23, 1926

W. R. Uggla
inventor

By: Marks & Clark
Attys.

Patented July 7, 1931

1,813,369

UNITED STATES PATENT OFFICE

WILHELM ROBERT UGGLA, OF MORBY, STOCKSUND, SWEDEN, ASSIGNOR TO LUTH & ROSENS ELEKTRISKA AKTIEBOLAG, OF STOCKHOLM, SWEDEN, A CORPORATION OF SWEDEN

POWER TRANSMISSION GEARING

Application filed October 23, 1926, Serial No. 143,657, and in Sweden October 28, 1925.

This invention relates to gearings of the type in which the driving shaft and the driven shaft (the main shafts) are located co-axially and between which are provided two series of gears, one on each side the said shafts, said series being of the same construction.

The object of this invention is to improve gearings comprising two series of gears and render the same practical even for very great total ratio of gearing between the driving shaft and the driven shaft. For that reason, according to the invention, two or more intermediate shafts with gear wheels are provided in each series, the intermediate shafts of each series being located at different distances from the main shaft. Owing to this arrangement, not only a great total ratio of gearing may be gained, but the arrangement also involves many practical advantages. Among others may be stated, that the radius and thus the width of all gears may be so adapted, that a uniform bearing of the teeth and a perfect mesh of all gears is effected. The size of the gears may be so adapted, that the weight of the gearing is small and the cost thus reduced.

Figure 1:
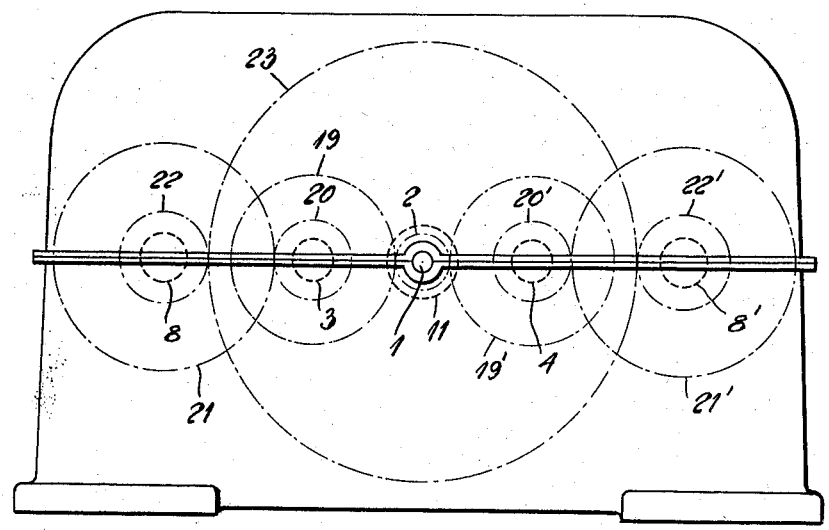
Figure 2:
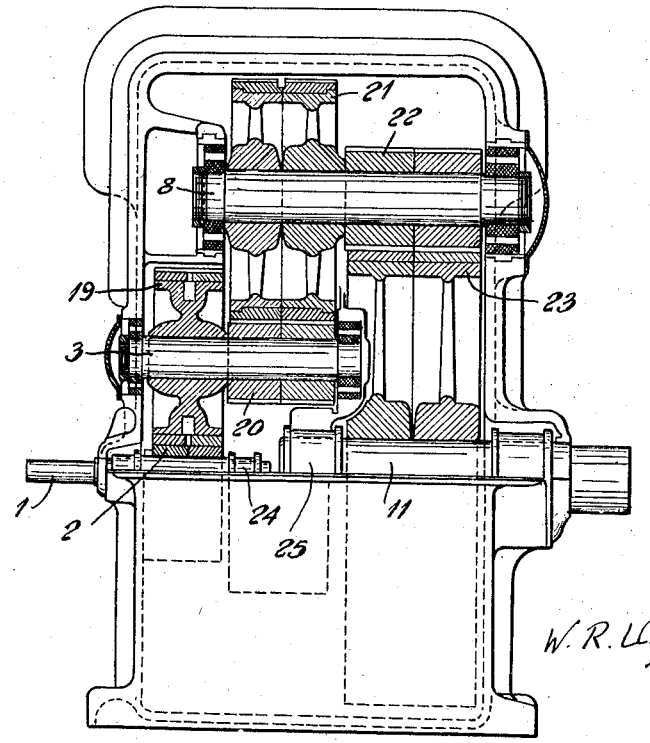

In the accompanying drawings, Fig. 1 is a side view of a gearing of the two series type embodying this invention. Fig. 2 shows, at the lower part, an elevational view of part of the casing containing the gearing and, at the upper part, a horizontal central section of the rear part of the said gearing, the part being swung upwards into the plane of the drawings.

1 is the drive shaft provided with the pinion 2. On opposite sides of the shaft 1, diametrically with relation to the same, two shafts 3 and 4 are located. A gear 19 is fixed on the shaft 3, meshing with the pinion 2. On shaft 3 a pinion 20 is provided, meshing with a gear 21 on a second intermediate shaft 8. Shaft 8 carries a pinion 22, which engages a gear 23, provided on the driven shaft 11. Shaft 11 is located axially in alignment with the driving shaft. The intermediate shafts 3 and 8 are located at different distances from the main shafts 1 and 11. Pinions and gears 19, 20, 21 and 22 belong to one of the series provided between the pinion 2 on the driving shaft 1 and the wheel 23 on the driven shaft 11. The second series of gears viz. gear 19', fixed on the shaft 4 and meshing with the pinion 2, pinion 20' on the same shaft 4 and meshing with the gear 21' on the intermediate shaft 8', which carries pinion 22' engaging the gear 23, is of the same construction as the series first described. Also the intermediate shafts 4 and 8' are located at different distances from the main shafts 1 and 11. All the said pinions and gears may be provided with angular teeth in order to render the transmission of the power free from shocks and uniform in both gear series, one of the intermediate gears of each series, 19 and 19' respectively, is made yieldable, for instance by the arrangement disclosed in the U. S. Letters Patent No. 1,580,769. All shafts are disposed in the same plane, which arrangement renders possible the dividing of the casing at the said plane, as shown in the drawings. The top part of the casing may then be removed, so that the bearings of the shafts are easily accessible for inspection, repairing etc. Owing to the disposing of the shafts in the same plane the pressures exerted on the teeth of the pinion 2 by the gears 19 and 19' at opposite sides of the pinion, which pressures are equal, will have opposite directions, owing to which fact no pressure is exerted on the bearings of the shaft 1 during the running, except the pressure resulting from the weight. For that reason the wear of the bearings of the shaft 1 is reduced to a minimum. The said intermediate shafts 3, 8, 4 and 8' rotate in ball or roller bearings, not shown.

By means of the arrangement of the gearing in accordance with this invention, room is provided for inner bearings 24 and 25 for the shafts 1 and 11, so that the said shafts are supported at both sides.

Through the provision of two or more intermediate shafts in each series in the manner stated above, the radii of the different gears, even at a great ratio of gearing, may be so adapted (and thus also the width and the pressures respectively, of the teeth), that the mesh of the teeth becomes reliable. Fig.

2 shows on a reduced scale a gearing of the two series type as used in practice. From the said figure the advantageous widths of the wheels are evident. Gearings of the two series type and arranged in accordance with this invention may advantageously be used in cases in which an electric motor, a turbine or any similar rapidly running engine, drives a working machine or the like at a small number of revolutions. Gearings arranged in accordance with this invention, which may be modified in one or other respect, may, however be adapted for other purposes.

I claim:

1. Power transmitting gearing comprising a drive shaft, a plurality of power receiving shafts including a driven shaft in axial alignment with the drive shaft and two series of intermediate shafts, each of said series comprising a plurality of shafts and said series being located at opposite sides of the drive and driven shafts, a casing enclosing the gearing and providing bearings for all of said shafts, there being a bearing at each end of each of the power receiving shafts and gears on said shafts for transmitting power from the drive shaft to the driven shaft, all of the gears on the power receiving shafts being located between bearings and one of the gears on an intermediate shaft in each series being peripherally resilient.

2. Power transmitting gearing comprising a drive shaft, a driven shaft in axial alignment with the drive shaft, two series of intermediate shafts, each of said series comprising a plurality of shafts and said series being located at opposite sides of the drive and driven shafts, gears on said shafts for transmitting power from the drive shaft to the driven shaft including a peripherally resilient gear on the first intermediate shaft of each series, a casing enclosing the gearing, a bearing in the wall of the casing for one end of the first intermediate shaft of each series, a bearing within the casing for the opposite end of each of said first intermediate shafts, and bearings in the walls of the casing for the ends of the second intermediate shaft of each series.

In testimony whereof I have hereunto affixed my signature.

WILHELM ROBERT UGGLA.